Figure 1:
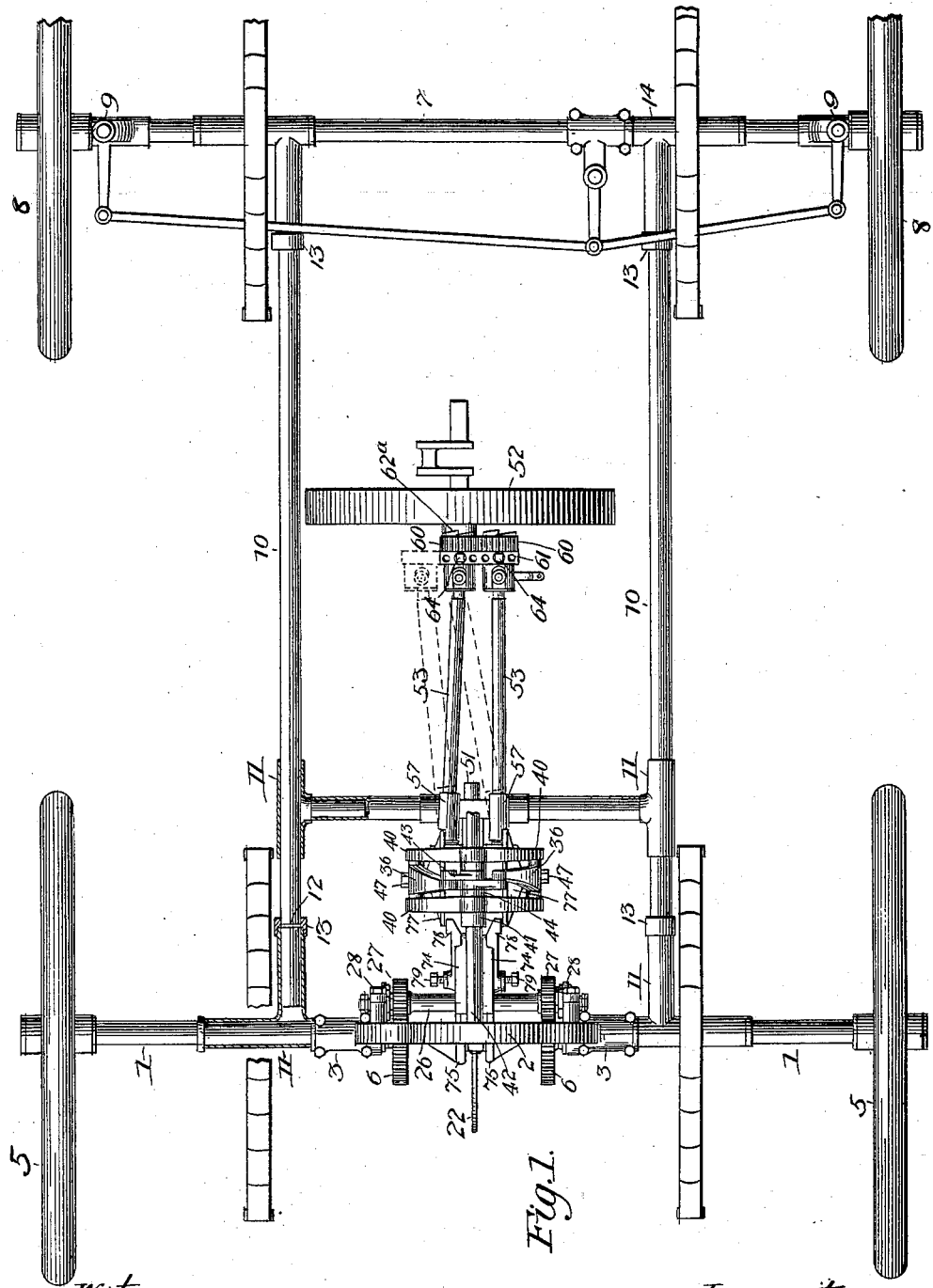

No. 654,716. Patented July 31, 1900.
E. P. COWLES.
MOTOR VEHICLE.
(Application filed Aug. 25, 1899.)
(No Model.) 5 Sheets—Sheet 1.

Witnesses:
Arthur L. Bryant
C. W. Clement

Inventor:
Edward P. Cowles
By Watson & Watson
Attys.

No. 654,716. Patented July 31, 1900.
E. P. COWLES.
MOTOR VEHICLE.
(Application filed Aug. 25, 1899.)
(No Model.) 5 Sheets—Sheet 2.
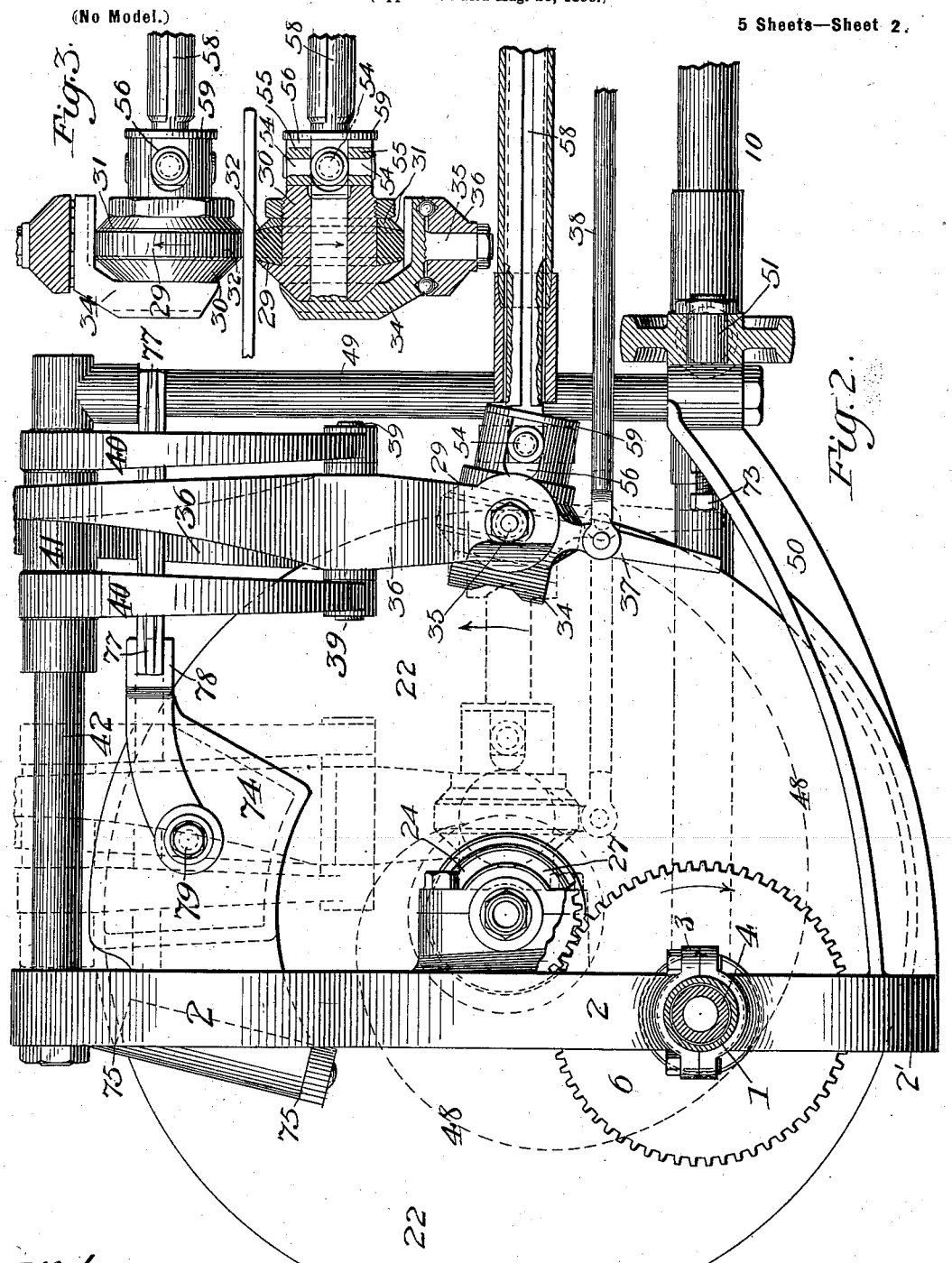
Witnesses:
Arthur L. Bryant
C. W. Clement
Inventor:
Edward P. Cowles
By Watson & Watson
Attys.

No. 654,716. Patented July 31, 1900.
E. P. COWLES.
MOTOR VEHICLE.
(Application filed Aug. 25, 1899.)
(No Model.) 5 Sheets—Sheet 3.
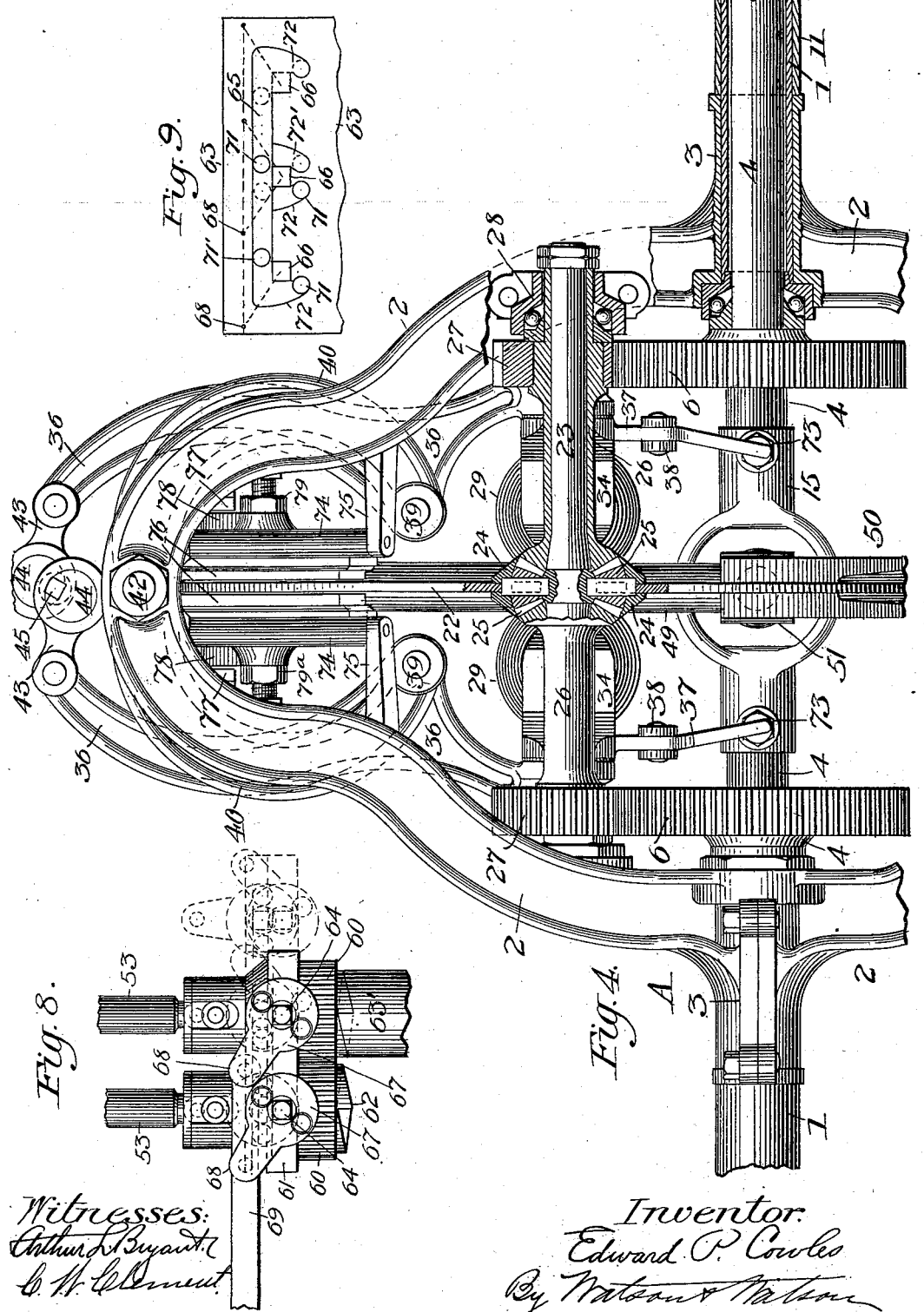

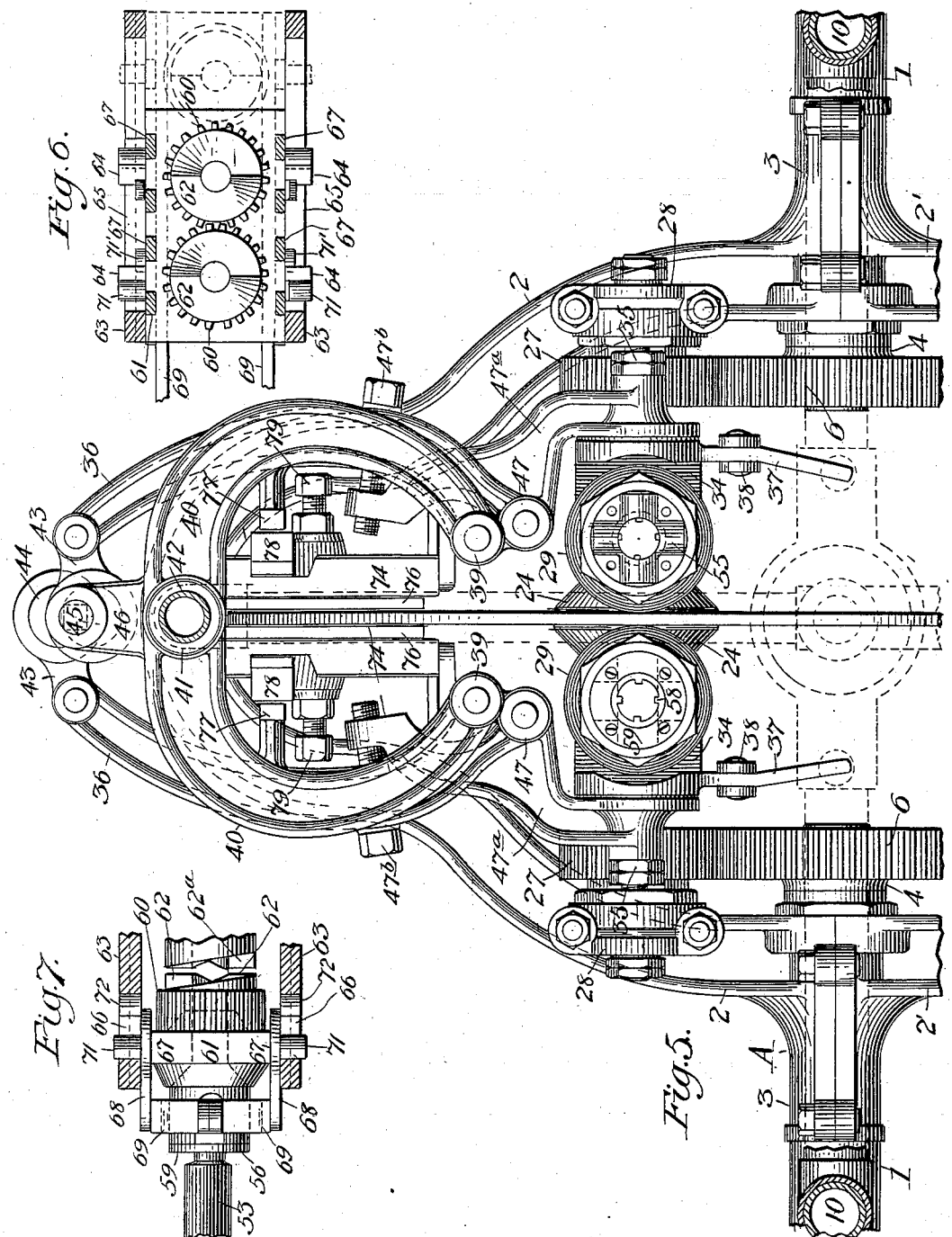

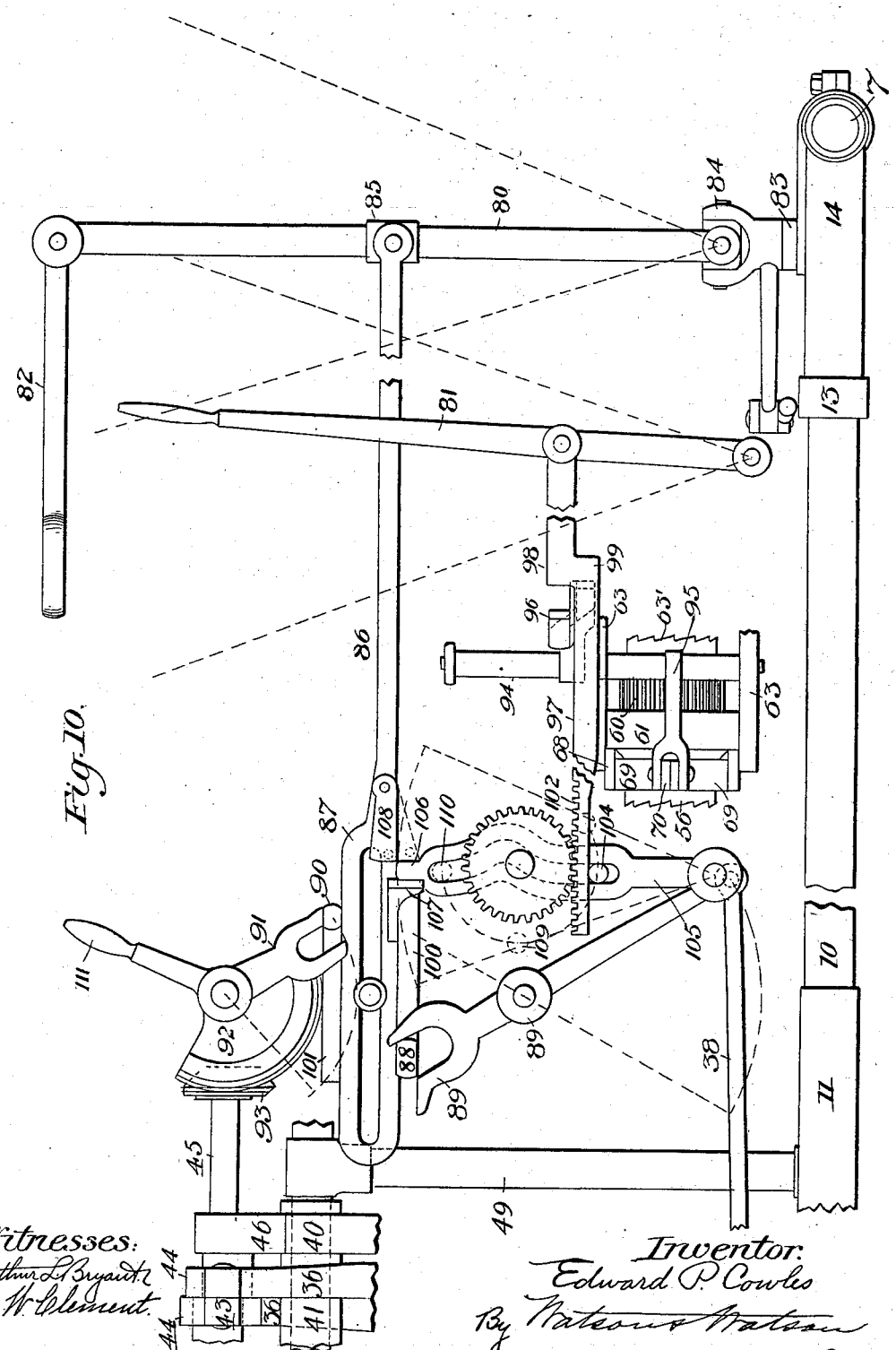

UNITED STATES PATENT OFFICE.

EDWARD P. COWLES, OF WARREN, OHIO.

MOTOR-VEHICLE.

SPECIFICATION forming part of Letters Patent No. 654,716, dated July 31, 1900.

Application filed August 25, 1899. Serial No. 728,502. (No model.)

*To all whom it may concern:*

Be it known that I, EDWARD P. COWLES, a citizen of the United States, residing at Warren, in the county of Trumbull and State of Ohio, have invented certain new and useful Improvements in Motor-Vehicles, of which the following is a specification.

My invention consists in improvements in the driving-gear of motor-vehicles, and has for its objects, first, to provide a driving-gear that will work perfectly smooth and noiseless and adapted to vary the speed or leverage between motor and driving-wheels conveniently and without shock; second, to provide a reversing-coupling for motors that revolve but one way, my invention being adapted to any kind of motor in use, and, third, a brake of peculiar construction.

The invention consists, further, in various improvements in construction and arrangement of parts and in specific devices for effecting the various movements, all of which will be fully described in the following specification, reference being had to the accompanying drawings, in which—

Figure 1 is a plan or top view of the running-gear of an automobile embodying my improvements. Fig. 2 is a side view of the driving-gear. Fig. 3 is a plan view and section of the friction-rollers. Fig. 4 is a rear view of the driving-gear partly in section. Fig. 5 is a front view of the driving-gear. Figs. 6, 7, 8, and 9 are views showing details of the reversing-coupling; and Fig. 10 is a diagrammatical view of the operating mechanism.

Referring to the drawings, A indicates the rear axle, which comprises tubular portions 1 and yokes 2, the yokes being provided with semihubs 3, in which the tubes 1 are securely clamped. Through the tubes 1 extend the driving-axles 4, which are provided on their outer ends with the driving-wheels 5 and on their inner ends, inside of the yokes 2, with spur-gears 6. The front axle 7 is a single straight tube connected to the steering-wheels 8 by the usual hinge-joints 9. The axles are connected by two reach-bars 10, the connections between these bars and the axles being made by long bearing-T's 11, in which the reach-bars and axles are free to turn. The reach-bars are prevented from longitudinal movement in the T's by means of collars 12, fast in the reach-bars and screw-caps 13, which are screwed over them and onto the ends of the T's, leaving the reach-bars free to turn, but confining them longitudinally by means of the collars 12. A cross-bar 15 is provided between the reach-bars a short distance in front of the rear axle, and to this cross-bar the yokes 2 are connected by braces to prevent them from turning under the reaction of the driving mechanism.

The driving mechanism consists of a thin disk 22 of suitable material, preferably hardened steel or "saw-steel," about sixteen inches or eighteen inches in diameter, mounted on a shaft 23, Fig. 2, by nut and collared hub 24, much in the same manner that a circular saw is mounted. Inside of hub 24 are the usual differential gears 25, which transmit the rotation power of disk 22 equally to two sleeves 26, turning loosely on shaft 23 and having pinions 27 secured near their outer ends, which intermesh with the gears 6, secured to the inner ends of the driving-axles 4. These gears can be of any proportion. In the present instance they are as two is to one. Shaft 23 is suitably mounted in bearings 28, extending from yoke 2.

Engaging frictionally with opposite sides of disk 22 are two driven friction-rollers 29, with their points of contact opposite, so that the contact-pressure of one balances or counteracts that of the other, and thus relieves disk 22 and its bearings wholly from the strain of this pressure. By reason of both rollers being driven, the frictional efficiency is doubled. These friction-rollers consist of a hub 30, carrying a flange, and a nut and washer 31, a ring of suitable friction material 32, preferably indurated paper fiber, being clamped between their slightly-beveled inside surfaces. Friction-rollers 29 turn on studs 33, extending from angular blocks 34, their axes being preferably parallel with the surface of disk 22. Extending from the other arm of the angular block 34 is a stud 35, preferably with its center line intersecting center line of 33 and passing through point of contact of roller with disk 22 perpendicular with surface of said disk. Pivot 35 serves to connect block 34 and its friction-roller to the lower arm of a lever 36, permitting a slight rotation or oscillation of friction-roller 29 to be effected and controlled by an arm 37, depending from block 34 and connected by a link 38 to mechanism to be hereinafter described. By this means the plane of revolution of friction-rollers can be shifted in either direction from a position at right angles to a plane containing the axis of disk 22 and a radius passing through point of contact, as shown by full lines in Fig. 2.

The levers 36 are pivoted at 39 between the arms of a yoke 40, extending down on both sides of disk 22 from a hub 41, sliding freely on a horizontal bar 42, extending from yoke 2. The upper ends of levers 36 are connected by links 43 to eccentrics 44, having their centers on opposite sides of their axis 45, forming a toggle-joint, by which levers 36 are made to vibrate on their pivots 39 and cause friction-rollers 29 to "bite" or relax their hold on disk 22 like a vise. It will be observed that yoke 40 is self-contained and sustains pressure of friction-wheels with the thrust and pull of eccentrics 44 independently of any other part. The hub of eccentrics 44 has its bearing on an arm 46, projecting from yoke 40. A square hole or socket in this hub admits a square rod 45, by turning which with suitable mechanism hereinafter described eccentrics 44 and levers 36 are manipulated.

In Fig. 5 I have shown means for adjusting the levers 36 to take the wear of the friction-rollers 29. In this figure the levers 36 terminate in hubs 47, in which are pivoted secondary levers 47ª. The lower ends of levers 47ª carry the friction-rollers 29, and their upper ends are connected to the levers 36 by means of bolts 47ᵇ. By means of these bolts the lower ends of levers 47ª may be adjusted relatively to the levers 36, and the rollers 29 thus made to grip the disk 22 more or less firmly. This adjustment also is used to compensate for wear, as above stated. It is obvious that when the rollers are biting the disk 22 it would require great power to slide them to and from its center; but when their plane of revolution is shifted from right angles to a radius of the disk passing through the point of contact, as hereinbefore described and as shown in Fig. 2, they will traverse automatically toward the center of the disk following the broken spiral line 48, and when the plane of revolution is shifted in the opposite direction they will traverse toward the periphery in the same manner. A slight force will cause the friction-wheels when under their greatest load to traverse back and forth from center to circumference, and vice versa, changing the speed of the driving-wheels and the leverage of the motor, as desired. As the friction-wheels 29 traverse to and from the center of the disks 22 they force the levers 36 and yoke 40 along with them, the sleeve 41 of yoke 40 being free to slide along horizontal bar 42 and the hub of eccentrics 44 being free to slide along square rod 45. The thrust and pull of friction-wheels 29 is transmitted by levers 36, yoke 40, and sleeve 41 to the horizontal bar 42, the front end of which is supported by a vertical bar 49, the lower end of which is secured to a forward extension 50 from lower part 2' of yoke 2, which in turn is pivoted at 51 to cross-piece 15, Figs. 1 and 2. In this manner the reaction from turning the driving-wheels is sustained by the perch-bars 10 10.

The friction-wheels 29 are preferably driven directly from the motor 52 by means of extensible rods 53, connected at both ends by flexible or universal joints, which may be of any suitable form, although I prefer the form shown, consisting of four pins 54, extending radially from the ends of the rods 53, on which are rollers 55, Fig. 3, fitting into slots 56 cut in the hubs 30, permitting free motion in every direction. Rollers 55 are retained in slots 56 by a washer 59, secured to the ends of the hubs 30. The outer parts of rods 53 are tubular, and each has a sleeve 57 on one end provided with feathers formed on its inside surface and fitting into grooves in a rod 58, which telescopes within the tube. In this manner rods 53 are adapted to extend as the friction-wheels 29 traverse toward the center of the disks 22. The ends of rods 53 toward the motor are coupled by joints similar to those above described to pinions 60, Figs. 6, 7, 8, and 9, having bearings in a block 61. These pinions intermesh and cause the rods 53 and friction-wheels 29 to revolve in opposite directions and to transmit the power of the motor to both friction-wheels. The sides of pinions 60 toward the motor have clutch members 62, either one of which will fit a similar clutch member 62ª on the motor-shaft. A block 61 slides between guides 63, attached to the motor-frame. It is guided by square pins 64, projecting from its upper and lower surfaces and sliding in slots 65 cut in the guides 63. When sliding in these slots, clutches 62 are maintained just far enough away to clear the motor-clutch 62ª. Pins 64 are preferably placed the same distance apart as the axes of pinions 60 and with their center lines intersecting them. In the side of slot 65 toward the motor are cut three square recesses 66, Fig. 7, of the same size as pins 64 and the same distance apart, the axis of the center recess 66 intersecting the axis of the motor-shaft clutch. Obviously when block 61 is moved along until pins 64 register with the center recess and one of the outer ones block 61 can be pushed toward the motor, and the clutch 62, which is opposite, will engage with the motor-clutch, and the rod 53 in line with the motor-shaft will be rotated with it, the other rod being rotated in the opposite direction. When they are moved so that the other clutch 62 is engaged, they will rotate in the opposite direction or the rotary motion of rods 53 will be reversed. This movement of block 61 is effected by means of four cams 67, which turn on round portions of the pins 64. They are all moved simultaneously by arms 68, connected by links 69, which are brought together at 70 and manipulated by suitable levers hereinafter described. Cams 67 each have two pins 71 71' on opposite sides of the center projecting outwardly and sliding in slot 65.

By referring to Fig. 9, which shows the upper side of lower guide 63, it will be seen that recesses 72 72' are cut in the side of slot 65 for pins 71 to swing into. In the position shown in Fig. 8 the right-hand gear 60 is engaged with motor. If rod 69 is pushed to the right, cams 67 will be turned, pins 71' and 71 will bear against the side of slot 65, and block 61 will be drawn away from motor and couplings 62 and 62$^a$ disengaged. When pins 71 71' in recess 72 72' reach the straight slot 65, cams 67 can turn no farther and block 61 is moved to the right. When the pins come opposite their respective recesses, cams 67 continue to turn, pins 71 71' act against the outside of slot 65, and the other two pins swing into recesses 72 72', and block 61 is forced toward motor, and left-hand coupling 62 engages motor-coupling 62$^a$ and is locked in this position. When link 69 is drawn in the opposite direction, the same operations take place in reverse order. The inside pins 71' are made shorter, extending only half-way through guide 63, and recesses 72' in center are cut only half-way through; otherwise, as will be seen in Fig. 9, the long pins 71 would have no bearing to withdraw block 61 at this point.

As hereinbefore stated, this invention is adapted to all forms of motors. The foregoing reversing device is particularly designed for hydrocarbon-motors and the like which revolve but one way, making it necessary to provide for reversing in the driving-gear. For pressure-motors, such as steam, compressed-air, and the like, which can be conveniently reversed, this reversing device would be uncalled for and would of course be left out. In such cases I would preferably have two motor-shafts connected by gears 60, with rods 53 coupled directly and permanently but flexibly thereto. For obvious reasons it would be objectionable to reverse while friction-rollers 29 were in contact or "biting" the disk 22, as it would subject all parts to great strain and wear. As will be hereinafter explained, reversing can take place only when friction-rollers are free. In this condition, the parts being of small diameter and very light weight, the inertia to be overcome is a negligible quantity, and the coupling can be safely made while motor-shaft is at full speed of six hundred revolutions per minute, the impact of coupling-teeth under these circumstances being equivalent to a body falling only eight inches.

Referring again to the friction-wheels 29, Fig. 2, arm 37 is purposely placed and link 38 pivoted to it on the side of friction-roller 29 from which the periphery at point of contact with disk 22 is moving. This causes friction-roller 29 in traversing to and from center of disk 22 to follow the lead of link 38, like a common "caster-wheel," and when the movement of link 38 stops from either direction wheel 29 automatically moves into position with its plane of revolution at right angles to a radius of disk 22, passing through point of contact with wheel 29 and remains in this position until link 38 is moved again. If, however, pivots 35 are placed at one side of radius of disk passing through point of contact, as hereinbefore mentioned, friction-roller 29 will act wholly like a caster-wheel, and its plane of revolution could be shifted from perpendicular to radius of disk passing through point of contact and traversed over the disk by pushing block 34 or yoke 40. I prefer, however, the arrangement shown. It will be understood that the foregoing description of movements for driving-gear are for a forward movement of the vehicle. In a backward movement involving a reverse movement of the driving-gear it would be difficult or impossible to cause wheel 29 to traverse to and from center of disk 22, from the fact that it would lead the movement of link 38, and when this movement stopped would not come into right angular position, but have a tendency to turn around on pivot 37; but in backing it is never practicable to use anything but the slowest speed, and traversing wheel 29 away from periphery of disk 22 is therefore not desirable. For this reason arm 37 is extended down and in backing is brought against a stop 73, which brings wheel 29 into proper position to act on disk 22 and holds it there during the reverse movement of the driving-gear. The movement of angular block 34 about its pivot 35 is restricted within certain limits, about ten or fifteen degrees either way, so that when for any reason it is desired to move yoke 40 without traversing wheels 29 to and from center of disk 22 wheels 29 can be released from disk and the whole device slid along the bar 42 and wheels 29 clamped at any point.

The brake consists of two swinging blocks 74, one on each side of disk 22, hinged to the yoke 2 at 75. When brought together, they clamp the disk like a vice. Each piece 74 is in the form of a box adapted to hold a block 76, of suitable friction material, which is adjustable to swinging piece 74 to take up wear by means of set-screw 79 and lock-nut 79$^a$. Levers 36 are provided with horizontal bars 77 on their upper ends, the inside faces of which are straight and parallel with sides of disk 22. They bear against lugs 78 on swinging pieces 74, and when eccentrics 44 are turned in the direction to release friction-wheels 29 or to draw the upper ends of levers 36 together they cause the brake 74 to clamp disk 22. By this means the brake can be applied in any position of yoke 40 between center and circumference of disk 22. The thrust of brakes 74 is received directly by yoke 2 and is transmitted to perch-bars 10 by means hereinbefore described. It will be observed that notwithstanding the action of the brakes is practically instantaneous they can never be applied when friction-wheels 29 are engaged with disk; neither can wheel 29 be applied when brakes are on. All strain and wear that would result from this source are therefore avoided.

In the arrangement of levers to bring about the several changes and operations if each change were made separately it would require a number of levers that would be very confusing and offer great liability to accident. I prefer the general arrangement shown in Fig. 10, where all the operations are brought about by manipulating two levers, a steering-lever 80 and a reversing-lever 81, the various changes being divided between them in the following order: For a steering-lever I prefer a horizontally-swinging lever 82, like the tiller of a boat, and I preferably attach the steering pivot or fulcrum to the running-gear, as it will work with greater precision than when attached to the body. The upright 80 is attached to the pivot 83 by flexible joint 84, permitting it to swing backward and forward, beside turning steering-joint 84. Near the center of 80 is attached by a joint 85, that turns loosely around 80, a horizontal rod 86, working a sliding cam-block 87. The lower cam 88 on block 87 engages the forked end of rocking lever 89, the lower end of which is attached to the rods 38 for traversing friction-wheels 29. The upper cam 90 engages a similar forked lever 91, attached to the segment of a bevel-wheel 92, which meshes with a pinion 93, attached to square shaft 45, which turns the eccentrics 44. The back and forward movement of lever 80 from a perpendicular by means of rod 86, block 87, cam 88, rocker-arm 89 causes wheels 29 to traverse disk 22 and vary the speed, as described. When the lever 80 has been moved backward so far that the wheels 29 are at the extreme periphery of disk and arms 37 against stops 73, cam 90 engages fork on 91, and by means of gears 92 93, shaft 45, eccentrics 44, and operating-levers 36 friction-wheels 29 are released. A farther backward movement of lever 80 causes the cam 88 to override the end of the rear arm of fork on lever 89 and lock said lever in its adjusted position, and this backward movement of lever 80 also sets the brakes. If now the lever 80 is moved forward, these operations are reversed, brakes are released, wheels clamped, and traversing from the periphery of the disk toward the center thereof or from slow to fast commences.

The cams 68 and links 69 of reversing device are operated by upright rock-shaft 94, the lower arm 95 of which is coupled to them at 70. The upper arm 96 is forked like levers 91 and 89. Pivoted to reversing-lever 81 is a horizontal slide-bar 97. This bar has an offset at 98, which engages one prong of fork 96, turning rock-shaft 94 and by means of its lower arm 95, link 69, and cams 68 reversing the motion of the friction-wheels 29, as hereinbefore described. In the return movement of 81 the lower offset 99 of bar 97 engages the lower prong of fork 96, and the movement is reversed.

It will be observed that the forks 89, 91, and 96 have prongs offset, so that when their respective cams 88 90 98 99 pass the point the straight parts 100, 101, 98, and 99 slide over and lock them in position. As the movements of friction-wheels 29 and brake 74 necessary in backing are effected by cam-block 87, instead of putting in an extra set of mechanism for this purpose I use a device that automatically couples bar 97 with cam-block 87 and performs these functions with the mechanism already provided. A backward extension of bar 97 has a rack 102, that meshes into a pinion 103, having an arm provided with a pin 104, which works in a slot in a vertical lever 105, having its lower end pivoted and its upper end 106 engaging a projection 107 on cam-block 87. In its forward movement 106 engages a latch 108, which is tripped at the point where cam 88 strikes fork 89, so that block 87 does not follow 105 in the remainder of its forward movement.

The cycle of movements of reversing-lever is as follows: The initial movement from extreme forward point 106 will engage 87 at any point where it happens to be left and traverse friction-wheels 29 to extreme periphery of disk and lock them there. When cam 90 strikes 91 and slightly releases wheels 29, offset 98 engages 96 and reversing commences and goes on simultaneously with tightening the brakes, &c., already described. When pin 104 of pinion 103 reaches the position 109, lever 105 commences to swing forward, and point 106 engages latch 108, releasing brakes and tightening wheels 29. When pin 104 reaches the position 110, the machine is moving backward. In the forward movement of lever 81 the motion of pinion 103 is reversed. When lever 105 has moved block 87 and cam 90 to engage 91 and release pressure of friction-wheels 29, the lower offset 99 on bar 97 engages the lower prong of fork 96 and the reversing commences and goes on simultaneously with releasing 29 and tightening the brakes, as in the previous movement. When pin on pinion reaches position 104, lever 105 is disengaged from latch 108 and the machine is moving forward and the lever 82 is free to traverse wheels 29.

The lever 111 serves to tighten the grip of friction-wheels or brake independently of the other mechanism. It will be understood that eccentrics 44 are encumbered with friction, so that they remain in any position and do not depend on the levers to hold them. It will also be observed, first, that the initial movement either in stopping or reversing is to traverse the friction-wheels 29 from center to circumference of disk 22, reducing the speed, for example, from twenty to five miles per hour before applying the brakes. This in itself is a very efficient brake, as it effects this reduction without slipping or friction of any sort; second, reversing cannot take place until speed is reduced, brake applied, and machine stopped; third, as hereinbefore pointed out, brakes cannot be applied when friction-wheels are engaged, and vice versa, also the friction-wheels cannot be applied except at the periphery of the disk, where they have the greatest leverage to start the machine, and then not when disk is moving in opposite direction; fourth, all the changes are positive, automatic, and interlocked, and no change can take place until the previous movement in the order has been completed, making accidents or derangements from carelessness or inexperience on the part of the driver impossible; fifth, all movements are natural—that is, a backward movement for slow, stop, or back and a forward movement for start, fast, or forward, so that nervous drivers in an emergency would make the proper movements instinctively; sixth, when stopped or the brakes applied the motor is practically disconnected from the driving mechanism.

If it is desired to use all four of the wheels as drivers, as would probably be the case in heavy machines in carrying from six to eight persons or for freighting purposes, I would place a driving-gear similar to that shown and operated in the same way in front, and I would preferably adapt all wheels for both driving and steering purposes substantially as shown and described in my patent for an improvement in traction-engines, No. 154,846, dated September 8, 1874.

I preferably place the disk 22 in position and geared to the axle, as shown. It is obvious, however, that it can be placed directly on the driving-axle 4 or any point between it and the motor or in any position, inclined, horizontal, or vertical, or the relations can be reversed and disk 22 made the driver and the friction-rollers be driven.

Another function of the rods 53, flexibly jointed at both ends, is to allow the body to play with the springs freely without interfering with the transmission of the power from the motor to drivers, and the transmission of the power has no effect to lift or pull down the body.

It will be evident that many changes in the details of construction and arrangement of the apparatus hereinbefore described can be made without departing from the spirit and scope of my invention. Thus, for instance, other forms of universal or flexible joints may be introduced between the shafts 53 and the friction-rollers, equivalent devices may be substituted for the eccentrics 44, such as cranks or shafts, and other means of mounting the friction-rollers so that their planes of movement may be adjusted angularly may be substituted for those shown. I intend in the broader claims of this specification to cover all such equivalent devices and in the more specific claims to cover the particular devices illustrated and described and which at the present time seem to me to be the best embodiment of the invention.

Having described my invention, what I claim, and desire to secure by Letters Patent, is—

1. In an automobile vehicle, the combination with the driving-wheels, of a rotatable disk, a friction-roller arranged to engage with said disk, and means for adjusting the plane of rotation of said roller angularly whereby it is made to automatically traverse the disk between center and circumference.

2. In a device for changing speed, a rotatable wheel or disk, a friction-roller arranged to engage said wheel or disk, and means for adjusting the plane of rotation of said friction-roller angularly to cause said roller to traverse the said wheel or disk either toward or from its center.

3. In a device for changing speed, the combination with a rotatable wheel or disk, of a friction-roller adapted to engage said wheel or disk, a support in which said roller is pivotally mounted with freedom to turn about a line at right angles to its axis, said support and roller being bodily movable toward and away from the center of the disk, and means for turning said roller about said line at right angles to its axis, for the purpose set forth.

4. In a device for changing speed, the combination with a rotatable disk, of a pair of friction-rollers arranged on opposite sides of said disk and adapted to engage the same, said rollers being free to turn about a line at right angles with the disk whereby they may be caused to traverse the disk between its center and circumference automatically, for the purpose set forth.

5. In a device for changing speed, the combination with a rotatable disk, of a yoke having arms on opposite sides of said disk, friction-rollers carried by said arms and adapted to engage with opposite faces of said disk, said rollers being free to turn and also arranged to swing about an axis at right angles to the disk, and means for turning them simultaneously about said axis whereby they are caused to traverse the disk between its center and circumference.

6. In a device for changing speed, the combination with a rotatable disk, of friction-rollers arranged on opposite sides of said disk, blocks having studs 33 upon which said rollers are mounted, supports to which said blocks are pivoted to move axially about a line at right angles to said disk, arms connected with the blocks, and means for turning said arms to cause the rollers to traverse the disk automatically between its center and circumference.

7. The combination with a rotatable wheel or disk, of a yoke-piece having arms on opposite sides of said disk, levers pivoted on the arms of said yoke, and friction-wheels mounted on said levers and adapted to engage the disk between them.

8. The combination with a rotatable wheel or disk, of a yoke-piece having arms on opposite sides of said disk, levers pivoted on the arms of said yoke, and friction-wheels mounted on said levers and adapted to engage the disk, said yoke being arranged to slide on a support which is parallel with the plane of the disk to carry said friction-rollers toward and away from the center of the disk, for the purpose set forth.

9. The combination with a rotatable wheel or disk, of a yoke-piece having arms on opposite sides of said disk, levers pivoted to said arms, friction-rollers carried by said levers, and eccentrics or equivalent devices pivotally supported on said yoke-piece and connected with said levers for the purpose of moving the rollers into and out of engagement with the disk.

10. The combination with a rotatable wheel or disk, of a yoke-piece having arms on opposite sides of said disk, levers pivoted to said arms, extension-pieces adjustably connected to said levers, friction-rollers carried by said extension-pieces and adapted to engage the disk, and means for simultaneously rocking the levers to move the rollers into and out of engagement with the disk.

11. The reversing device comprising a motor-shaft provided with a clutch member, a pair of shafts to be driven thereby, and each provided with a clutch member, and means for engaging the motor-shaft clutch member with either of the driven-shaft clutch members.

12. A reversing device comprising a movable block, a pair of shafts having bearings in said block, intermeshing gears on said shafts whereby they are made to rotate in opposite directions, clutch members on said shafts, a motor-shaft having a clutch member, and means for shifting said block and shafts to engage either of their clutch members at will with the motor-shaft whereby said driven shafts may be driven in either direction as desired.

13. A reversing device comprising a motor-shaft having a clutch member, a pair of shafts to be driven thereby each provided with a clutch member, intermeshing gears on said shafts, a common support or block in which said shafts are mounted, and cams governing the movements of said support or block whereby the clutch member of either driven shaft may be locked in engagement with the motor-shaft clutch member, for the purpose set forth.

14. The combination with a disk to be driven, of friction-rollers arranged on opposite sides of said disk and movable radially of the disk to vary its speed, extensible shafts for driving said friction-rollers, intermeshing gears on said shafts, clutch members on said shafts, a motor-shaft having a coöperating clutch member, and means for engaging either of the roller-shaft clutch members with the motor-shaft clutch member.

15. The combination with a disk to be driven, of friction-rollers on opposite sides of the disk and movable radially thereto to vary its speed, extensible driving-shafts for said friction-rollers, intermeshing gears on said driving-shafts, flexible joints connecting said shafts with said rollers and gears, a motor-shaft having a clutch member, corresponding clutch members on said gears, and means for shifting the gears to engage either of them at will with the motor-shaft clutch member, for the purpose set forth.

16. In a motor-vehicle, the combination with a driven disk, of a pair of friction-wheels arranged on opposite sides of said disk for driving the same, a pair of brake-shoes on opposite sides of said disk, and a common means for engaging the friction-rollers and the brake-shoes alternately with the disk to operate and stop the same.

17. In a motor-vehicle, the combination with a disk, friction-rollers arranged on opposite sides of said disk, levers upon which said friction-rollers are mounted, and means for rocking the levers to engage and disengage the friction-rollers and disk, of movable brake-shoes arranged on opposite sides of the disk, and connections between said levers and brake-shoes whereby the movement of the levers to disengage the rollers effects the application of the brake-shoes to the disk.

18. In a motor-vehicle, the combination of a disk, friction-rollers on opposite sides of said disk, means for moving said rollers radially of the disk to vary its speed, levers for clamping and releasing said friction-rollers, brake-shoes movably mounted on opposite sides of the disk, and connections between said levers and said brake-shoes whereby the latter are applied when the levers are moved to disengage the friction-rollers from the disk, the braking power being the same in any adjustment of the levers and friction-rollers with respect to the center of the disk.

19. In a motor-vehicle, the combination with a motor, driving-wheels, and mechanisms for applying brakes, varying speed, and connecting and disconnecting the motor, of a single operating-lever connected to said mechanisms, and means whereby the rearward movement of said lever brings the speed to a minimum, then disconnects the motor and finally applies the brakes, and the reverse or forward movement of said lever successively releases the brakes, connects the motor to the driving-wheels at reduced speed, and finally increases the speed to a maximum, substantially as set forth.

20. In a motor-vehicle, the combination with the driving-wheels and a motor, of reversing mechanism between said driving-wheels and motor, a lever for operating said reversing mechanism, means for connecting and disconnecting the motor with the driving-wheels, a lever for operating said means, and means for interlocking the reversing and disconnecting mechanisms whereby the motor must be disconnected before the direction of rotation of the driving-wheels can be reversed.

21. In a device for changing speed, the combination with a driven disk, of a pair of friction-rollers arranged on opposite sides of said disk and adapted to engage and drive the same, blocks upon which said rollers are mounted, said blocks and rollers being adjustable about an axis at right angles to the plane of the disk, arms 37 extending from said blocks in a direction contrary to the direction of movement of the contiguous part of the disk, and means for adjusting said arms to cause the friction-wheels to travel radially across the disk.

22. In a device for changing speed, the combination of the driven disk, the friction-roller for driving the same, a pivotally-mounted block carrying said roller, the arm for adjusting said block about an axis at right angles to the disk, and the stop 73 for limiting the outward movement of said arm.

23. The combination with the driven disk, of a friction-roller for driving the same, a block in which said friction-roller is mounted with freedom for adjustment about an axis at right angles to the plane of the disk, the driving-shaft for said friction-roller, and the joint between said driving-shaft and friction-roller comprising the hollow sleeve on one of said parts provided with longitudinal slots, and the radial pins on the other part coöperating with said slots.

24. In a motor-vehicle, the combination with the driving-wheels, a disk for driving the same, a motor for driving said disk, and brake-shoes coöperating with said disk, of means for alternately applying the motor and the brake-shoes to said disk, and a steering-lever connected to and operating said means and also connected to the steering-wheels, substantially as described.

25. In a motor-vehicle, the combination with a shaft, such as 45, for controlling the motor and the brake, of a steering-lever, and connections between said lever and said shaft for turning the latter as the former is moved forward or backward.

26. In a motor-vehicle, the combination with a shaft, such as 45, for operating the brakes and connecting and disconnecting the motor, of a lever for operating said shaft, and connections comprising a sliding rod 86, forked arm 91, cam-piece on said rod for operating said arm, and bevel-gears 92, 93 connecting said arm and said shaft, for the purpose set forth.

27. In a reversing-gear for motor-vehicles, the combination with a driven disk, and friction-wheels adjustable radially to said disk to change its speed, of devices for reversing the direction of said friction-wheels, a lever for operating said devices, and connections between the speed changing and reversing devices whereby the reversal can be only brought about when the friction-wheels are brought to the periphery of the driving-disk.

28. In a motor-vehicle, the combination with a motor adapted to run in one direction only, of reversing devices, speed-changing devices, motor-disconnecting devices, and operating mechanism for all of said devices so interlocked that the speed must necessarily be reduced to a minimum and the motor then disconnected before the reversing device proper can operate to change the direction of movement of the vehicle.

29. In a motor-vehicle, the combination with means for varying the speed, and means for applying a brake, of a motor, and connections for operating said means, the speed varying and braking means being so interlocked that the speed must be reduced to a minimum before the brake can be applied.

30. In a motor-vehicle, the combination of speed-changing means, a forked lever 89 for operating the same, braking means, and a forked lever 91 for operating the same, with a cam-block having projections to engage said forked levers and operate them alternately.

31. In a motor-vehicle, the combination with forked levers such as 89 and 91, the prongs of said forks being offset, of a cam-block having projections to operate on one prong of each fork, and elongated surfaces to coöperate with the other prong of each fork, whereby the forked levers are operated during a portion of the movement of the cam-block, said levers being arranged to operate alternately.

32. In a motor-vehicle, the combination of speed-changing and motor-disconnecting devices, and a lever for operating the same, of reversing devices, an independent lever for operating the reversing devices, and means for connecting the reversing-lever also with the speed-changing and brake-applying devices.

33. In a motor-vehicle, the combination with speed-changing devices, a brake device, and a motor-disconnecting device, of reversing devices, interlocking connections between all of said devices, and a single hand-lever adapted and arranged to operate all of said devices.

34. In a motor-vehicle, the combination with the reversing-clutch, of a rock-shaft for operating the same, the arm on said shaft having an offset fork, the offset rod adapted to operate alternately on the prongs of said fork, and the lever connected to said rod.

In testimony whereof I affix my signature in presence of two witnesses.

EDWARD P. COWLES.

Witnesses:
ROBT. E. GORTON,
W. D. PACKARD.